United States Patent Office 3,324,040
Patented June 6, 1967

3,324,040
HOMOGENEOUS BENZOYL PEROXIDE PASTE
Peter W. Spoor, Trenton, N.J., assignor to Wallace and Tiernan, Inc., a corporation of Delaware
No Drawing. Filed Sept. 17, 1965, Ser. No. 488,230
2 Claims. (Cl. 252—186)

This is a continuation-in-part of my copending application Ser. No. 298,404, filed July 29, 1963, now abandoned.

It has been discovered that commercially satisfactory storage stability, i.e., with respect to the separation of the components into a liquid and a solid phase, is present in a homogeneous paste composition consisting essentially of: (a) benzoyl peroxide having a particle size of about 5–60 microns, about 44–57%; (b) monohydric alcohol ester of benzene polycarboxylic acid, which ester is inert to and capable of softening said peroxide, about 27–40%; water, not more than about 5%; alkylphenyl polyethylene glycol ether nonionic surfactant, about 12–17%; silica aerogel, about 3–5%; water-dispersible silicone anti-foaming agent, about 0.2–1%, where all of said percentages are by weight based on said composition.

This invention relates to an intimate dispersion (homogeneous paste) of solid benzoyl peroxide, in a liquid plasticizer, characterized by good storage stability.

Benzoyl peroxide is used as a catalyst for many reactions and as a cross-linking agent for certain resins. This peroxide is a solid and it is difficult to get this solid into intimate admixture with the other components in the reaction system. Attempts have been made to overcome this problem by dispersing the peroxide in a liquid medium. Liquids which have solubility for the peroxide, and thereby cause it to soften (swell) are especially used. Dispersing (suspending or thixotropic) agents have also been added to the peroxide liquid (plasticizer) dispersion. These dispersions have the benefits of increased ease of handling the peroxide, easier dispersibility into the reaction mixture, and better control of the amount added. However, even the best of these dispersions have relatively poor storage life, up to about two weeks storage at ambient temperatures; a distinct separate phase of peroxide solids separates out of a liquid phase.

BENZOYL PEROXIDE

In paste composition of the invention the solid benzoyl peroxide is in particulate form having a particle size of about 5–60 microns, and preferably about 5–30 microns. While the particles can be obtained by crushing the agglomerates produced by ordinary processes, it is preferred to grow single crystals of the proper size. The paste composition includes about 44–57 percent, on a weight basis, of the solid peroxide particles.

A preferred procedure for growing crystals is: A vessel provided with a propeller stirrer and a heating means is used as the crystallizer. The desired amount of water is added to the vessel. The vessel contents are heated to 55° C. The desired plasticizer, preferably butyl benzyl phthalate (25 parts by weight), is added to the vessel with vigorous stirring. Then 51 parts by weight of benzoyl peroxide (100% basis) is added. The contents are stirred for about 2 hours at about 55° C.

At the end of two hours, the stirring is stopped and the vessel contents allowed to settle. The water layer is decanted, leaving a doughy mass containing some occluded water. The doughy mass is "squeezed" to force out as much as possible of the water because it has been observed that for adequate storage life about 5% is the maximum tolerable amount of water in the final paste composition.

The crystal growth is easily determined by microscopic inspection of (1) a dispersion in mineral oil of a sample of the benzoyl peroxide as charged and (2) a dispersion in mineral oil of a portion of the squeezed mass.

The final stirring time is related to the desired size of the product crystals; the shorter the time, the lower the yield of the larger (25–30 micron size) crystals. A two hour time results in a size range predominating in the larger size crystals.

Peroxide decomposition makes it very desirable to hold the crystal growth temperature below about 58° C. Lower temperatures slow the crystal growth rate.

The amount of plasticizer present affects both the time needed and the crystal size attained; larger amounts favor shorter times and larger crystal sizes.

PLASTICIZER

The plasticizer must be chemically inert to and be capable of softening the solid benzoyl peroxide particles; this softening is observed as a swelling of the particles upon contact with the plasticizer. The plasticizer used in the paste composition of the invention is a monohydric alcohol ester of benzene polycarboxylic acid. A mixed ester or mixtures of ester may be used.

The benzene nucleus of the acid may be substituted with one or more hydrocarbon radicals, usually alkyl groups having 1–8 carbon atoms. At least two carboxyl groups are present. It is preferred that the acid be a benzene hydrocarbon polycarboxylic acid having 2–3 carboxyl groups on the ring. Illustrative of these preferred acids are: phthalic acid or anhydride; isophthalic acid, butylphthalic anhydride; octylisophthalic acid; trimellitic acid; trimellitic acid anhydride; trimesic acid.

The plasticizer ingredient of the paste composition is one or more esters of one or more monohydric alcohols and defined acid. The alcohols which contain only carbon atoms, hydrogen atoms and hydroxyl group, i.e., hydrocarbon alcohols, are preferred as sources of plasticizer esters. Especially preferred are the alkanols having 1–13 carbon atoms, the cycloalkanols having 5–6 carbon atoms in the ring and a total of not more than 13 carbon atoms, and monohydric benzene hydrocarbon alcohols having a total of not more than 13 carbon atoms. The term "alkanol" is derived from *alkane* and the suffix *ol* to designate a monohydric saturated acyclic hydrocarbon alcohol. A "benzene hydrocarbon alcohol" is benzene hydrocarbon compound containing a hydroxyl group in a side chain, e.g., benzyl alcohol, phenethyl alcohol, phenpropyl alcohol, and phenhexyl alcohol.

Illustrative especially preferred esters are: dimethyl phthalate; dibutyl phthalate; dioctyl phthalate; dinonyl phthalate; di-tridecyl phthalate; dibenzyl isophthalate; butyl benzyl phthalate, diisooctylisophthalate; decyl benzyl isophthalate; triethyl trimellitate; dibutyl benzyl trimellitate; trioctyl trimesate; tri-tridecyl trimesate; dicyclohexyl isophthalate; butyl cyclohexyl isophthalate; and cyclohexyl benzyl isophthalate.

The paste composition includes about 27–40% of the defined plasticizer; commonly 29–38% of the especially preferred benzene polycarboxylic acid ester.

WATER

Although, it is difficult to obtain essentially anhydrous benzoyl peroxide or to operate with a completely dry system, satisfactory pastes can be made with zero water content, i.e., "zero" within analytical precision. It has been found that the paste cannot tolerate more than about 5% of water. When using the peroxide crystal-plasticizer mass as the source of peroxide, it has been observed the final paste composition will contain about 1–4% of water.

NONIONIC SURFACTANT

The composition of the invention includes an alkylphenyl polyethylene glycol ether or mixture thereof which is a nonionic surfactant. Desirably the surfactant is the condensation product of ethylene oxide and an alkylphenol having 6–15 alkyl carbon atoms. Usually 4–20 moles of oxide are reacted per mole of alkylphenol; desirably 6–15 moles of oxide. In the case of alkylphenol having 8–12 alkyl carbon atoms, it is preferred to react with 9–12 moles of ethylene oxide groups to form the surfactant.

The composition includes about 7–12% of the defined nonionic surfactant.

SILICA AEROGEL

The composition includes a silica aerogel. About 3–5% of silica aerogel is present. The various finely divided silicas used as hydrocarbon oil thickeners and in rubber compounding are suitable. Those variously called, colloidal silica, silica aerogel, Santocel, and fumed silica are suitable for use in the invention. It has been observed that exceptional results are demonstrated with silica having a particle size approximating 0.015 micron (a bulk density of about 4 p.c.f.).

ANTI-FOAMING AGENT

In order to obtain a homogeneous paste composition (intimate dispersion), it is necessary to have present in the mixture of ingredients any one of the well-known water-dispersible silicone anti-foaming agents.

Water-dispersible silicone anti-foaming agents are widely used in commerce and are available from several suppliers. Recent literature includes: Silicones by G. G. Freeman, 1962; ILIFFE Books, London. Silicones by S. Fordham, 1960; Philosophical Libraray, New York. Silicones by Meals and Lewis, 1959; Reinhold Publishing Corp., New York. Organosilicon Compounds by C. Eaborn, 1960; Academic Press, New York.

Briefly: The anti-foams are fluid polydimethylsiloxanes (methylsilicones). These are effective in organic solutions or when dissolved or dispersed in aqueous systems. Although these are only slightly soluble in water, the normal usage is so low, 5–20 parts per million, that they can be readily dispersed in aqueous system in amount sufficient to eliminate foaming. A simple test for determining the efficiency of these silicones as anti-foams in aqueous systems is given by Ghosh and Pirt in Rend. Inst. Sup. di Sanita (1954), 17, p. 149. The defined silicone may be used as such as preferably as an aqueous dispersion. Usually a silica aerogel is added to the silicone to assist in obtaining an aqueous dispersion. Or an organic dispersing (emulsifying) agent is added to the silicone. In some cases both silica aerogel and organic dispersing agent are present in the water-dispersible silicone anti-foam agent.

While the amount of anti-foam agent needed is markedly dependent on the amount of water and surfactant present, in general the usage is about 0.2–1% and commonly about 0.3–0.7%. (These amounts are enormously larger than those used in the ordinary organic liquid or aqueous system applications.)

THE PASTE COMPOSITION

The commercial purchaser is interested in the benzoyl peroxide content of the composition and it is customary to prepare pastes at definite fixed peroxide content, such as 46%, 51% and 56%, or to a level specified by the purchaser. When peroxide of a known water content is available, it is simple enough to arrive at the optimum stability composition using the desired plasticizer and surfactant. However when using the crystal growth mass previously described, the water content varies from batch to batch and some adjustment of the ingredients must be made by trial and error blending to obtain the desired homogeneous paste (intimate dispersion) of satisfactory storage stability.

In order to assist the workers in this art in determining the optimum composition, three exemplary compositions of typical peroxide content made from crystal growth butyl benzyl phthalate mass are set out in Table I.

TABLE I[1]

|  | A | B | C |
|---|---|---|---|
| Benzoyl Peroxide (100%)[2] | 46 | 51 | 56 |
| Butyl benzyl phthalate [3] | 34–38 | 30–34 | 29–33 |
| Water | 1–4 | 1–4 | 1–4 |
| Surfactant [4] | 11 | 10.5 | 8 |
| Silica [5] | 5 | 4.5 | 3 |
| Anti-Foaming Agent [6] | 0.5 | 0.5 | 0.5 |

[1] Percent by weight of paste.
[2] 15–30 micron size crystals.
[3] Commercial grade.
[4] Nonylphenyl polyethylene glycol ether having 9–10 moles of ethylene oxide present (Tergitol NPX).
[5] Cab-O-Sil MS-7.
[6] General Electric water dispersible silicone anti-foam agent, AF-24, consists of polydimethylsiloxane, silica aerogel and organic dispersing agent; it is described in G.E. Silicone Products Dept. Product Data Sheet AF-24 (560).

Examples

A storage stable peroxide paste composition consisting essentially of, on a weight basis: benzoyl peroxide having a particle size of about 5–30 microns, about 46–56%; butyl benzyl phthalate, about 29–38%; water, about 1–4%; nonylphenyl polyethylene glycol ether having about 9–10 ethylene oxide groups, about 8–11%, silica having a particle size of approximately 0.015 microns, about 3–5%; and water-dispersible silicone anti-foaming agent, about 0.5%.

Three illustrative pastes were prepared using crystal growth-plasticizer mass prepared as described above. A weighted amount of the mass was placed in a vessel provided with a high speed propeller stirrer. Additional plasticizer and the surfactant were then blended into the mass. The silica aerogel was then added and the contents were mixed for 10 minutes. The contents developed considerable foam before the anti-foaming agent was added. The mixing was then continued for 20 minutes to obtain a smooth homogeneous (intimately dispersed) paste product.

Three examples of paste compositions were made up using ingredients as described in Table I above. These pastes are set out, by ingredient proportions, in Table II.

TABLE II

| Example Past | X | Y | Z |
|---|---|---|---|
| Benzoyl Peroxide | 46 | 51 | 56 |
| Butyl benzyl phthalate | 36 | 31 | 29 |
| Water | 2 | 3 | 4 |
| Surfactant | 11 | 10.5 | 8 |
| Silica | 5 | 4.5 | 3 |
| Anti-Foaming Agent | 0.5 | 0.5 | 0.5 |
| Total | 100.5 | 100.5 | 100.5 |

The totals in Table II are coincidental and represent typical results of rounding-off of numbers.

The above paste compositions X, Y, and Z were tested for stability using a clinical centrifuge—15 minutes at 1750 r.p.m. They showed no separation.

Also the apparent viscosity was measured at 23° C. using an E spindle at 2.5 r.p.m. (Brookfield Model HBT viscometer) The viscosity ranged over 240,000,–300,000 centipoises.

The shelf storage life was tested by standing at room temperature for 30 days—none of these paste compositions showed any separation.

COMPARISON TESTS (1) A commercial type paste consisting of 50% of benzoyl peroxide and 50% butyl benzyl phthalate was prepared. This paste had an initial viscosity of 640,000 centipoises and showed much separation in the centrifuge test. Much separation occurred in the 30 day shelf storage test.

(2) Another commercial type paste was prepared using equal parts of benzoyl peroxide and butyl benzyl phthalate and 2% of Cab-O-Sil MS-7. The initial viscosity of this paste was over one million centipoises; some separation occurred in both the centrifuge test and the 30 day shelf storage test.

Thus having described the invention what is clamed is:

1. A storage stable peroxide paste composition consisting of, on a weight basis:
   solid benzoyl peroxide particles having a size of about 5–30 microns, about 46–56%;
   butyl benzyl phthalate, about 29–38%;
   water, about 1–4%;
   nonylphenyl polyethylene glycol ether having about 9–10 ethylene oxide groups, about 8–11%;
   silica having a particle size of approximately 0.015 micron, about 3–5%; and
   water-dispersible, fluid polydimethylsiloxane antifoaming agent, about 0.5%.

2. A storage stable peroxide paste composition consisting of, on a weight basis:
   solid benzoyl peroxide particles having a size of about 15–30 microns, about 51%;
   butyl benzyl phthalate, about 31%;
   water, about 3%;
   nonylphenyl polyethylene glycol ether having about 9–10 ethylene oxide groups, about 10.5%;
   silica having a particle size of approximately 0.015 micron, about 4.5%; and
   water-dispersible, fluid polydimethylsiloxane antifoaming agent, about 0.5%.

References Cited
UNITED STATES PATENTS

| | | | |
|---|---|---|---|
| 2,454,254 | 11/1948 | Kuoch | 252—186 X |
| 2,838,472 | 6/1958 | Lucas | 252—186 X |
| 2,927,084 | 3/1960 | Wahl | 252—186 X |

OTHER REFERENCES

"Tergitol Surfactants," Union Carbide Chemicals, 1956, pages 4, 14, 23.

LEON D. ROSDOL, *Primary Examiner.*

ALBERT T. MEYERS, *Examiner.*

M. WEINBLATT, *Assistant Examiner.*